(12) United States Patent
Sharma et al.

(10) Patent No.: US 11,915,395 B2
(45) Date of Patent: Feb. 27, 2024

(54) HOLOGRAPHIC DISPLAY SYSTEM FOR A MOTOR VEHICLE WITH REAL-TIME REDUCTION OF GRAPHICS SPECKLE NOISE

(71) Applicant: GM Global Technology Operations LLC, Detroit, MI (US)

(72) Inventors: Manoj Sharma, Troy, MI (US); Kai-Han Chang, Sterling Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 17/813,781

(22) Filed: Jul. 20, 2022

(65) Prior Publication Data

US 2024/0029208 A1   Jan. 25, 2024

(51) Int. Cl.
  *G06T 5/00* (2006.01)
  *B60K 35/00* (2006.01)
  *G02B 27/01* (2006.01)

(52) U.S. Cl.
  CPC .............. *G06T 5/002* (2013.01); *B60K 35/00* (2013.01); *G02B 27/0103* (2013.01); *G02B 2027/0109* (2013.01)

(58) Field of Classification Search
  CPC .... G06T 5/002; B60K 35/00; G02B 27/0103; G02B 2027/0109
  See application file for complete search history.

(56) References Cited

U.S. PATENT DOCUMENTS

| | | | |
|---|---|---|---|
| 9,057,874 B2 | 6/2015 | Seder et al. | |
| 10,747,314 B1 | 8/2020 | Chang et al. | |
| 10,860,093 B1 | 12/2020 | Chang et al. | |
| 10,880,529 B2 * | 12/2020 | Chang | G02B 27/0172 |
| 10,926,638 B1 | 2/2021 | Chang et al. | |
| 11,024,056 B2 | 6/2021 | Chang et al. | |
| 11,106,044 B2 | 8/2021 | Seder et al. | |
| 11,135,881 B2 | 10/2021 | Hall et al. | |

(Continued)

OTHER PUBLICATIONS

U.S. Appl. No. 17/714,410, filed Apr. 6, 2022, John P. Weiss.
U.S. Appl. No. 17/714,418, filed Apr. 6, 2022, John P. Weiss.
U.S. Appl. No. 17/813,794, filed Jul. 20, 2022, Kai-Han Chang.

*Primary Examiner* — Amy R Hsu
(74) *Attorney, Agent, or Firm* — Vivacqua Crane PLLC (57) ABSTRACT

A holographic display system provides a maximum intensity value of an intermediate image to decrease a graphics speckle noise. The system includes an SLM having a display with a hologram generating unit and a plurality of pixels for modulating a beam of coherent light. The system further includes a beam splitter for splitting the beam into an object beam and an intermediate image beam that is associated with an intermediate image having the noise. The system further includes a camera for capturing the intermediate image, in response to the camera receiving the intermediate image beam. The system further includes a computer having a processor and a CRM. The processor is programmed to generate an actuation signal associated with a corrective holographic phase shift to decrease the noise. The SLM modifies in real-time a holographic phase of the beam per pixel, in response to the SLM receiving the actuation signal.

20 Claims, 2 Drawing Sheets

(56) References Cited

U.S. PATENT DOCUMENTS

| | | |
|---|---|---|
| 2010/0164702 A1 | 7/2010 | Sasaki et al. |
| 2014/0362195 A1 | 12/2014 | Ng-Thow-Hing et al. |
| 2016/0059855 A1 | 3/2016 | Rebhan et al. |
| 2019/0233034 A1 | 8/2019 | Viele et al. |
| 2020/0355512 A1 | 11/2020 | Cho |
| 2021/0055688 A1* | 2/2021 | Shen .................. G02B 27/0101 |
| 2021/0195146 A1* | 6/2021 | Christmas .......... G02B 27/0103 |
| 2022/0044032 A1 | 2/2022 | Baltaxe et al. |
| 2022/0066211 A1* | 3/2022 | Seder ..................... G09G 3/001 |
| 2022/0157044 A1* | 5/2022 | Schick ................... G06V 20/95 |
| 2022/0375034 A1* | 11/2022 | Bashkansky .............. G06T 5/10 |

\* cited by examiner

FIG. 1

HOLOGRAPHIC DISPLAY SYSTEM FOR A MOTOR VEHICLE WITH REAL-TIME REDUCTION OF GRAPHICS SPECKLE NOISE

INTRODUCTION

The present disclosure relates to holographic display systems for motor vehicles, and more particularly to a holographic display system with real-time rectification to suppress speckle noise in holographic displays.

Car manufacturers are continuously developing holographic display systems (e.g., Augmented Reality Head Up Displays or ARHUDs) with a LASER that can provide a wide color gamut and high efficiency. However, these systems can provide reduced image quality due to graphics speckle noise, which causes an image to have a noisy and granular appearance rather than a smooth and consistent appearance. One approach to image de-speckling is the use of a rotating or vibrating optical diffuser that is positioned between the LASER and the projection surface. With the optical diffuser being driven by a motorized component. The motorized components can add to overall power consumption and complexity of the system. However, the optical diffuser may not fit in a compact ARHUD. Furthermore, for systems that project the phase holograms directly to users' eyes, an optical diffuser cannot be used.

Thus, while existing holographic display systems achieve their intended purpose, there is a need for a new and improved holographic display system that addresses these issues.

SUMMARY

According to several aspects of the present disclosure, a holographic display system of a motor vehicle provides a maximum intensity value of an intermediate image to decrease in real-time a graphics speckle noise. The holographic display system includes a light source for generating a beam of coherent light. The system further includes a spatial light modulator (SLM) having a display with a hologram generating unit and a plurality of pixels for modulating the beam of coherent light, in response to the display receiving the beam of coherent light from the light source. The system further includes a beam splitter for splitting the beam of coherent light into an object beam and an intermediate image beam that is associated with the intermediate image having the graphics speckle noise, in response to the beam splitter receiving the beam of coherent light from the SLM. The system further includes a camera for capturing the intermediate image, in response to the camera receiving the intermediate image beam from the beam splitter. The system further includes a computer having one or more processors electronically connected to the camera and the hologram generating unit of the display. The computer further includes a non-transitory computer readable storage medium (CRM) including instructions, such that the processor is programmed to receive the intermediate image from the camera. The processor is further programmed to compare one or more parameters to one or more associated threshold values. The processor is further programmed to generate an actuation signal associated with a corrective holographic phase shift based on the intermediate image to reduce the graphics speckle noise for each of the pixels. The SLM modifies in real-time a holographic phase of the beam of coherent light per pixel, in response to the SLM receiving the actuation signal from the processor.

In one aspect, the parameter is an iteration count, and the threshold value is a predetermined threshold number of iterations for each pixel. The processor increases the iteration count by one.

In another aspect, the processor is further programmed to calculate a modified entropy, in response to the processor receiving the intermediate image from the camera. The processor is further programmed to generate the actuation signal associated with the corrective holographic phase shift that produces a minimum modified entropy.

In another aspect, the processor is further programmed to calculate a variance metric, in response to the processor receiving the intermediate image from the camera. The processor is further programmed to generate the actuation signal associated with the corrective holographic phase shift that produces a maximum variance metric.

In another aspect, the processor is further programmed to calculate a loss function value, in response to the processor receiving the intermediate image from the camera. The processor is further programmed to generate the actuation signal associated with the corrective holographic phase shift that produces a minimum loss function value.

In another aspect, the system further includes one or more optical components mounted to the motor vehicle and receiving the object beam from the beam splitter.

In another aspect, the optical component includes a windshield directing the object beam to an occupant positioned in the motor vehicle.

According to several aspects of the present disclosure, a computer is provided for a holographic display system of a motor vehicle to decrease in real-time a graphics speckle noise. The system includes a light source for generating a beam of coherent light. The system further includes a spatial light modulator (SLM) having a display with a hologram generating unit and a plurality of pixels for modulating the beam of coherent light. The system further includes a beam splitter for splitting the beam of coherent light into an object beam and an intermediate image beam that is associated with an intermediate image having a graphics speckle noise. The system further includes a camera for capturing the intermediate image. The computer includes one or more processors electronically connected to the camera and the hologram generating unit of the display. The computer further includes a non-transitory computer readable storage medium (CRM) storing instructions, such that the processor is programmed to receive the intermediate image from the camera. The processor is further programmed to compare one or more parameters to one or more associated threshold values. The processor is further programmed to generate an actuation signal associated with a corrective holographic phase shift based on the intermediate image to reduce the graphics speckle noise for each of the pixels. The SLM modifies in real-time a holographic phase of the beam of coherent light per pixel, in response to the SLM receiving the actuation signal from the processor.

In one aspect, the parameter is an iteration count, and the threshold value is a predetermined threshold number of iterations for each pixel. The processor increases the iteration count by one.

In another aspect, the processor is further programmed to calculate a modified entropy, in response to the processor receiving the intermediate image from the camera. The programmer is further programmed to generate the actuation signal associated with the corrective holographic phase shift that produces a minimum modified entropy.

In another aspect, the processor is further programmed to calculate the modified entropy according to:

$$H[I_{norm}] = \sum_{m=1}^{M} \sum_{n=1}^{N} I_{norm}(m,n) \log[I_{norm}(m,n)]$$

where $I_{norm}$ represents a normalized camera image; and where $H[I_{norm}]$ represents a modified entropy metric; and where (m, n) represents pixels in an associated one of (x, y) directions.

In another aspect, the processor is further programmed to calculate the normalized camera image according to:

$$I_{norm}(m,n) = \beta I(m,n)/I_{max}(m,n)$$

where $I_{max}$ represents the maximum intensity value of the intermediate image.

In another aspect, the processor is further programmed to calculate a variance metric, in response to the processor receiving the intermediate image from the camera. The processor is further programmed to generate the actuation signal associated with the corrective holographic phase shift that produces a maximum variance metric.

In another aspect, the processor is further programmed to calculate the variance metric according to:

$$V[I] = \frac{1}{MN} \sum_{m=1}^{M} \sum_{n=1}^{N} I^2(m,n) - \left[\frac{1}{MN} \sum_{m=1}^{M} \sum_{n=1}^{N} I(m,n)\right]^2$$

where V[I] represents the variance metric; where M represents a pixel value in an x-direction with a maximum value M; where N represents a pixel value in a y-direction with a maximum value N.

In another aspect, the processor is further programmed to calculate a loss function value, in response to the processor receiving the intermediate image from the camera. The processor is further programmed to generate the actuation signal associated with the corrective holographic phase shift that produces a minimum loss function value.

In another aspect, the processor is further programmed to calculate the loss function value according to:

$$\min_\theta \mathcal{L}(a_{cal}, a_{target})$$

where $\min_\theta \mathcal{L}$ represents the minimized loss function value; where $a_{cal}$ represents a modified camera captured image associated with a modified hologram phase; and where $a_{target}$ represents a target graphics image.

According to several aspects of the present disclosure, a method of operating a holographic display system of a motor vehicle provides a maximum intensity value of an intermediate image to decrease a graphics speckle noise. The system includes a light source, a spatial light modulator (SLM), a beam splitter, a camera, and a computer, which has one or more processors and a non-transitory computer readable storage medium (CRM) storing instructions. The SLM includes a display with a hologram generating unit and a plurality of pixels. The method includes generating, using the light source, a beam of coherent light. The method further includes modulating, using the display of the SLM, the beam of coherent light in response to the display receiving the beam of coherent light from the light source. The method further includes splitting, using the beam splitter, the beam of coherent light into an object beam and an intermediate image beam that is associated with an intermediate image having a graphics speckle noise. The method further includes capturing, using the camera, the intermediate image in response to the camera receiving the intermediate image beam from the beam splitter. The method further includes receiving, using the processor, the intermediate image from the camera. The method further includes comparing, using the processor, one or more parameters to an associated one or more threshold values in response to the processor receiving the intermediate image from the camera. The method further includes generating, using the processor, an actuation signal associated with a corrective holographic phase shift to decrease the graphics speckle noise for each of the pixels based on the intermediate image. The method further includes modifying in real-time, using the SLM, a holographic phase of the beam of coherent light per pixel in response to the SLM receiving the actuation signal from the processor.

In one aspect, the method further includes comparing, using the processor, an iteration count to a predetermined threshold number of iterations for each pixel. The method further includes increasing, using the processor, the iteration count by one.

In another aspect, the method further includes calculating, using the processor, a modified entropy and a variance metric in response to the processor receiving the intermediate image from the camera. The method further includes generating, using the processor, the actuation signal associated with the corrective holographic phase shift that produces a minimum modified entropy and a maximum variance metric.

In another aspect, the method further includes calculating, using the processor, a loss function value in response to the processor receiving the intermediate image from the camera. The method further includes generating, using the processor, the actuation signal associated with the corrective holographic phase shift that produces a minimum loss function value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
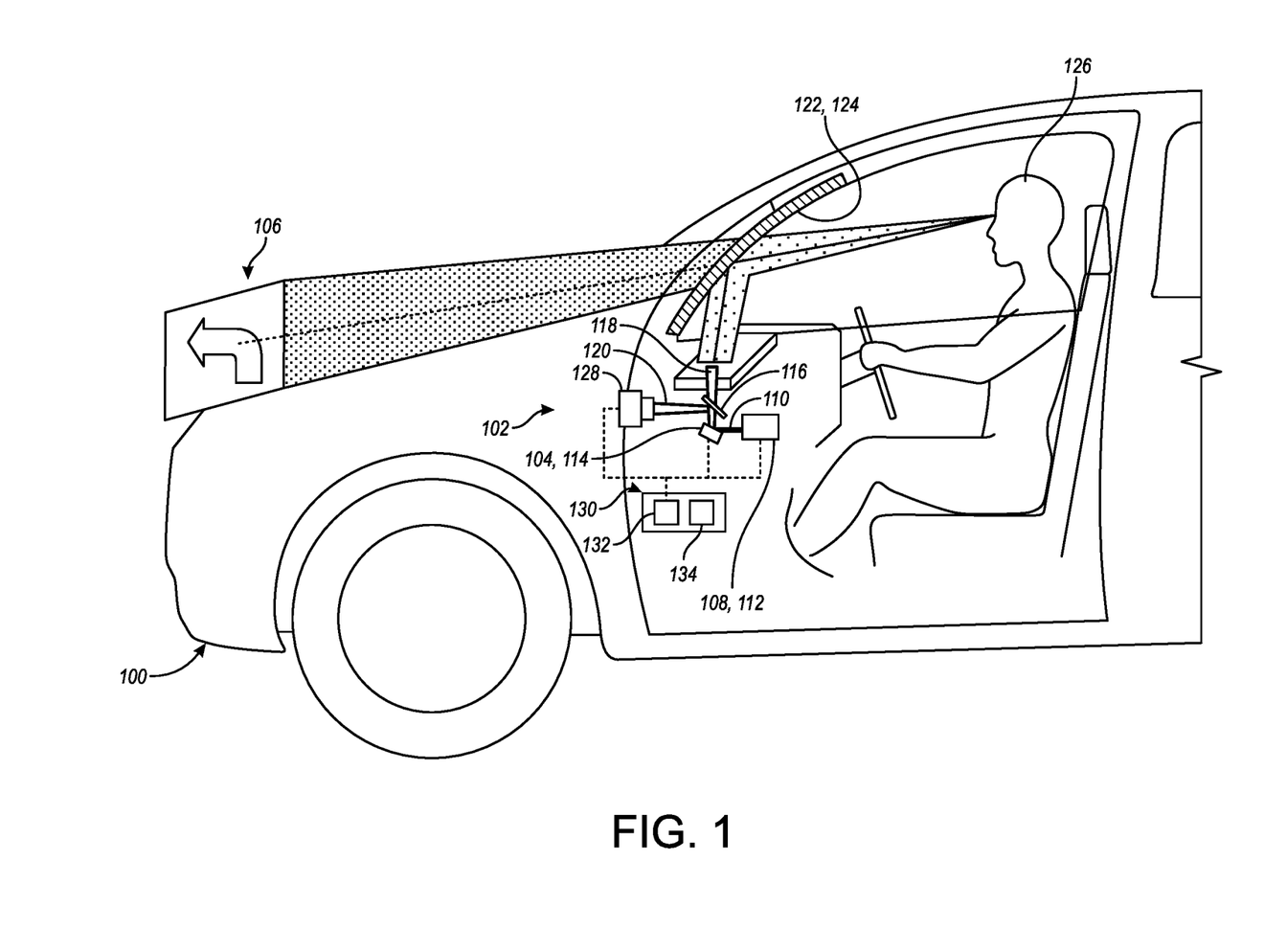
FIG. 1 is a schematic view of one example of a motor vehicle having a holographic display system for providing a maximum intensity value of an intermediate image to decrease in real-time a graphics speckle noise.

The present disclosure described one example of a motor vehicle 100 includes a holographic display system 102 (system) providing a maximum intensity value of an intermediate image to decrease in real-time a graphics speckle noise. More specifically, the system 102 executes an optimization algorithm over a predetermined number of iterations to enable a Spatial Light Modulator 104 (SLM) to modify in incremental steps a phase value of a beam of light from 0 to $2\pi$ for each pixel, such that the system 102 reduces graphics speckle noise in a hologram. Non-limiting examples of the motor vehicle is a land vehicle (e.g., a sedan, a light duty truck, a heavy duty truck, a sport utility vehicle, a van, a motor home, etc.). The motor vehicle 100 is an autonomous vehicle, a semi-autonomous vehicle, or a non-autonomous (manual) vehicle.

Referring to FIG. 1, one non-limiting example of the system 102 is an Augmented Reality Head-Up Display 106 (ARHUD) that can blend holographic display elements with other display elements or environmental characteristics to make holographic images appear in relation to the physical world. However, it is contemplated that other non-limiting examples of the system can have non-holographic display elements.

The system 102 includes a light source 108 (e.g., a LASER) for generating a beam of coherent light 110 or encoded hologram. One non-limiting example of the light source 108 can include a LASER 112. While a single LASER 112 is depicted in FIG. 1, it is contemplated that the system can include two or more LASERS, such as separate red, green, and blue LASERS.

The system 102 further includes the SLM 104 having a display 114 with a hologram generating unit 115 and a plurality of pixels for modulating the beam of coherent light 110, in response to the SLM 104 receiving the beam of coherent light 110 from the light source 108. In this non-limiting example, the SLM 104 is a fast-switching phase-only device with driving circuitry to provide a frame rate. The frame rate can be a 60 Hz frame rate. However, it is contemplated that the frame rate can be above or below 60 Hz. In this non-limiting example, the display 114 is a liquid crystal on silicon (LCoS) display 114 that provides diffractive phase elements to support holographic projection. In other examples, the SLM can be a MEMS shutter display or DLP DMD array.

The system 102 further includes a beam splitter 116 for splitting the beam of coherent light 110 into an object beam 118 and an intermediate image beam 120, in response to the beam splitter 116 receiving the beam of coherent light from the SLM 104. The intermediate image beam 120 is associated with the intermediate image having the graphics speckle noise. In this non-limiting example, the beam splitter 116 is a 90/10 beam splitter 116.

The system 102 further includes one or more optical components 122 mounted to the motor vehicle 100 and receiving the object beam 118 from the beam splitter 116. In this non-limiting example, the optical component 122 includes a windshield 124 directing the object beam 118 to an occupant 1226 (e.g., a driver) positioned in the motor vehicle 100. Another non-limiting example of the optical element can include a Fourier-transform lens (not shown), with the LASER projecting a LASER beam incident to the display of the SLM with corresponding diffracted images passing through the Fourier-transform lens to perform beam forming to focus the resulting perceived image on a display surface. Still another non-limiting example of the optical element can include a scanner (not shown) for directing a plurality of subframes onto associated sections of a display surface. The scanner can include a screen scanning system, a viewing-zone scanning system, and a 360-degree scanning system. It is contemplated that other examples of the system having other suitable SLMs may not include the scanner.

The system 102 further includes a camera 128 for capturing the intermediate image, in response to the camera 128 receiving the intermediate image beam 120 from the beam splitter 116.

The system 102 further includes a computer 130 for controlling the SLM 104 to reduce graphics speckle noise. The computer 130 includes one or more processors 130 electronically connected to the camera 128 and the hologram generating unit 115 of the display 114. The processor 130 can include processing circuitry that may include an application specific integrated circuit (ASIC), an electronic circuit, and a processor (shared, dedicated, or group). The processor 130 can include an input/output interface for communicating with various components, such as an input frame source and the SLM 104. The processor 130 can use known image processing techniques to determine a phase hologram to output on the display that will result in the diffracted images responsive to the LASER. When the system 102 is incorporated in a vehicle, the input frame source can be a vehicle control unit, for instance, to display gauge values, logos, information, entertainment content, or other such image-based data.

The computer 130 further includes a non-transitory computer readable storage medium 134 (CRM) storing instructions, such that the processor 130 executes one or more software or firmware programs, a combinational logic circuit, and/or other suitable components that provide the described functionality.

The processor 130 is further programmed to execute an optimization algorithm for a fixed number of iterations for each SLM pixel to reduce the graphics speckle noise by modifying in incremental steps the phase value of the beam of coherent light 110 (e.g., a corrective holographic phase shift) from 0 to $2\pi$. In one non-limiting example where the original graphic is not used for optimization (e.g., when the original graphic is unknown) and/or the graphics speckle noise is above a predetermined value (e.g., a predetermined value when graphics speckle noise is severe), the processor 130 is programmed to generate an actuation signal to enable the SLM 104 to minimize entropy and maximize a variance of the intermediate image. More specifically, in response to the processor 130 receiving the intermediate image from the camera 128, the processor 130 is programmed to calculate a modified entropy according to Equations 1 and 2:

$$I_{norm}(m,n) = \delta I(m,n)/I_{max}(m,n) \quad \text{Eqn. 1}$$

$$H[I_{norm}] = \sum_{m=1}^{M} \sum_{n=1}^{N} I_{norm}(m,n) \log[I_{norm}(m,n)] \quad \text{Eqn. 2}$$

where $H[I_{norm}]$ represents a modified entropy metric; where (m, n) represents pixels in an associated one of (x, y) directions; where $I_{norm}$ represents a normalized camera image; and where $I_{max}$ represents the maximum intensity value of the intermediate image.

In further response to the processor 130 receiving the intermediate image from the camera 128, the processor 130 is programmed to calculate a variance metric according to Equation 3:

$$V[I] = \frac{1}{MN}\sum_{m=1}^{M}\sum_{n=1}^{N} I^2(m,n) - \left[\frac{1}{MN}\sum_{m=1}^{M}\sum_{n=1}^{N} I(m,n)\right]^2 \quad \text{Eqn. 3}$$

where V[I] represents the variance metric; where m represents a pixel value in an x-direction with a maximum value M; where n represents a pixel value in a y-direction with a maximum value N.

The processor 132 is programmed to compare one or more parameters to one or more associated threshold values. In this non-limiting example, the parameter includes an iteration count, and the threshold value includes a predetermined threshold number of iterations for each pixel (e.g., 100 iterations). The processor 130 generates the actuation signal based on the minimum entropy metric and the maximum variance metric, and the processor 130 increases the iteration count by one. The SLM 104 modifies, in real-time, the holographic phase of the beam of coherent light 110, in response to the SLM 104 receiving the actuation signal from the processor 130.

In another non-limiting example where the original graphic is known and/or the graphics speckle noise is below the predetermined value, the processor 130 is programmed to generate an actuation signal to enable the SLM 104 to minimize a loss function value. More specifically, in response to the processor 130 receiving the intermediate image from the camera 128, the processor 130 is programmed to calculate the loss function value according to Equation 4:

$$\min_\theta \mathcal{L}\,(a_{cal}, a_{target}) \qquad \text{Eqn. 4}$$

where $\min_\theta \mathcal{L}$ represents the minimized loss function value; where $a_{cal}$ represents a modified camera captured image associated with a modified hologram phase; and where $a_{target}$ represents a target graphics image.

Figure 2:
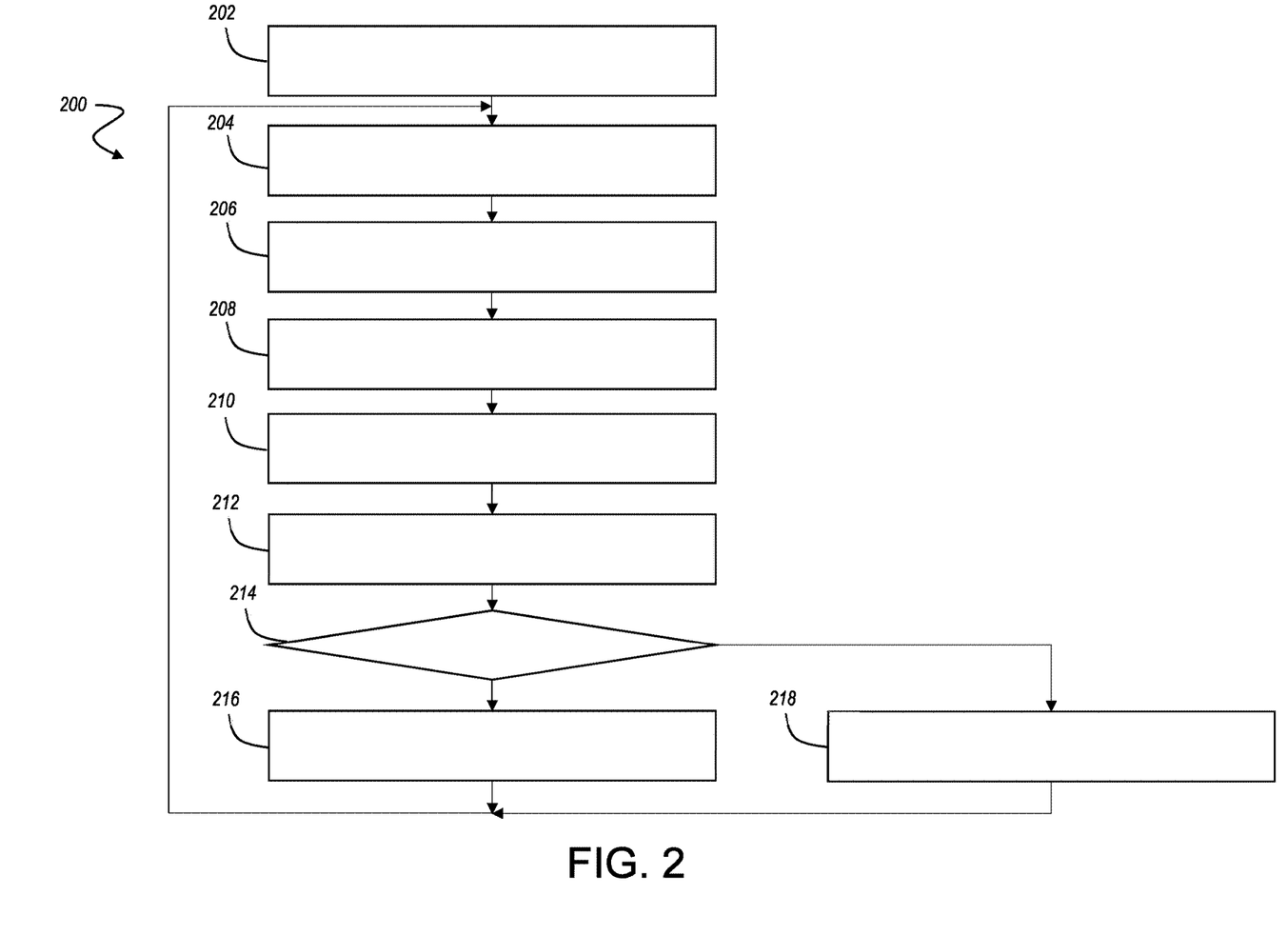
FIG. 2 is a flow chart of one exemplary method of operating the holographic display system of FIG. 1.

Referring to FIG. 2, a method 200 of operating the system 102 of FIG. 1 provides the maximum intensity value of an intermediate image to decrease a graphics speckle noise. The method 200 begins at block 202 with the light source 108 generating the beam of coherent light 110. Continuing with the previous non-limiting example, the light source 108 can include a LASER 112. While the single LASER 112 is depicted in FIG. 1, other non-limiting examples of the system can include two or more LASERS, such as separate red, green, and blue LASERS.

At block 204, the method 200 further includes modulating, using the display 114 of the SLM 104, the beam of coherent light 110 in response to the display 114 receiving the beam of coherent light 110 from the light source 108 and receiving the actuation signal from the processor 130. In this non-limiting example, the SLM 104 is the fast-switching phase-only device with driving circuitry to provide a high-frame rate. The high frame rate can be a 60 Hz frame rate. However, it is contemplated that the frame rate can be above or below 60 Hz.

At block 206, the method 200 further includes splitting, using the beam splitter 116, the beam of coherent light 110 into the object beam and the intermediate image beam associated with the intermediate image. In this non-limiting example, the beam splitter 116 is a 90/10 splitter. In other examples, the system can include any other suitable beam splitter.

At block 208, the method 200 further includes capturing, using the camera, the intermediate image in response to the camera receiving the intermediate image beam from the beam splitter 116.

At block 210, the method 200 further includes receiving, using the processor 130, the intermediate image from the camera 128.

At block 212, the method 200 further includes executing, using the processor 130, the optimization algorithm for the fixed number of iterations for one of the SLM pixels for reducing the graphics speckle noise to modify in incremental steps the phase value of the beam of coherent light 110 (e.g., a corrective holographic phase shift) from 0 to $2\pi$. In one non-limiting example where the original graphic is not used for optimization (e.g., when the original graphic is unknown) and/or the graphics speckle noise is above a predetermined value, the processor 130 is programmed to generate the actuation signal to enable the SLM 104 to minimize entropy and maximize a variance of the intermediate image. More specifically, the processor 130 is programmed to calculate the modified entropy according to Equations 1 and 2 and calculate the variance according to Equation 3 above, in response to the processor 130 receiving the intermediate image from the camera 128. The method 200 further includes generating, using the processor 130, the actuation signal associated with the corrective holographic phase shift that produces the minimum modified entropy and the maximum variance metric.

In another non-limiting example, where the original graphic is used for optimization (e.g., when the original graphic is known) and/or the graphics speckle noise is below the predetermined value, the processor 130 can be programmed to generate that actuation signal to enable the SLM 104 to minimize the loss function value, in response to the processor 130 receiving the intermediate image from the camera 128. More specifically, the processor 130 is programmed to calculate the loss function value according to Equation 4 above, in response to the processor 130 receiving the intermediate image from the camera 128. The method 200 can further include generating, using the processor 130, the actuation signal associated with the corrective holographic phase shift that produces the minimum loss function value.

At block 214, the method 200 further includes comparing one or more parameters to one or more associated threshold values. In this non-limiting example, the parameter includes the iteration count for the associated pixel, and the threshold value includes the predetermined threshold number of iterations for each pixel (e.g., 100 iterations). The processor 130 compares the iteration count to the predetermined threshold number of iterations for each pixel. If the processor 130 determines that the iteration count for the associated pixel is below the predetermined threshold number, the method 200 proceeds to block 216. If the processor 130 determines that the iteration count for the associated pixel is equal to the predetermined threshold number, the method 200 proceeds to block 218.

At block 216, the method 200 further includes generating, using processor 130, the actuation signal based on the current minimum entropy and the current maximum variance. The processor 130 increases the iteration count by one, and the method 200 returns to block 204 where the SLM 104 modifies in real-time the holographic phase of the beam of coherent light 110 for the current pixel, in response to the SLM 104 receiving the actuation signal from the processor.

At block 218, the method 200 includes generating, using the processor 130, the actuation signal associated with a corrective holographic phase shift to decrease the graphics speckle noise based on the overall minimum entropy and the overall maximum variance for the current pixel. The method 200 further includes resetting, using the processor, the iteration count to zero and directing the optimization algorithm to another pixel that was not previously analyzed by the processor 130. The method 200 returns to block 204 where the method 200 further includes modifying in real-time, using the SLM 104, the holographic phase of the beam of coherent light 110, in response to the SLM 104 receiving the actuation signal from the processor.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor 130 may be communicatively coupled to, e.g., via the vehicle communications module, more than one local processor, e.g., included in electronic processor units (ECUs) or the like included in the vehicle 100 for monitoring and/or controlling various vehicle components. The processor 130 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 130 may transmit messages to various devices in the vehicle 100 and/or receive messages from the various devices, e.g., vehicle sensors, actuators, vehicle components, a human machine interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A holographic display system of a motor vehicle for providing a maximum intensity value of an intermediate image to decrease in real-time a graphics speckle noise, the holographic display system comprising:

a light source for generating a beam of coherent light;

a spatial light modulator (SLM) comprising a display with a hologram generating unit and a plurality of pixels for modulating the beam of coherent light in response to the display receiving the beam of coherent light from the light source;

a beam splitter for splitting the beam of coherent light into an object beam and an intermediate image beam in response to the beam splitter receiving the beam of coherent light from the SLM, with the intermediate image beam being associated with an intermediate image having the graphics speckle noise;

a camera for capturing the intermediate image in response to the camera receiving the intermediate image beam from the beam splitter;

a computer comprising at least one processor electronically connected to the light source, the SLM, and the camera, and the computer further comprising a non-transitory computer readable storage medium (CRM) storing instructions such that the processor is programmed to:

receive the intermediate image from the camera;

compare at least one parameter to at least one threshold value; and generate an actuation signal associated with a corrective holographic phase shift to decrease the graphics speckle noise for each of the pixels based on the intermediate image;

where the SLM modifies in real-time a holographic phase of the beam of coherent light per pixel in response to the SLM receiving the actuation signal from the at least one processor.

2. The holographic display system of claim 1 wherein the at least one parameter comprises an iteration count, and the at least one threshold value comprises a predetermined threshold number of iterations for each pixel, and the at least one processor increases the iteration count by one.

3. The holographic display system of claim 1 wherein the at least one processor is further programmed to:

calculate a modified entropy in response to the at least one processor receiving the intermediate image from the camera; and generate the actuation signal associated with the corrective holographic phase shift that produces a minimum modified entropy.

4. The holographic display system of claim 3 wherein the at least one processor is further programmed to:

calculate a variance metric in response to the at least one processor receiving the intermediate image from the camera; and generate the actuation signal associated with the corrective holographic phase shift that produces a maximum variance metric.

5. The holographic display system of claim 1 wherein the at least one processor is further programmed to:

calculate a loss function value in response to the at least one processor receiving the intermediate image from the camera; and generate the actuation signal associated with the corrective holographic phase shift that produces a minimum loss function value.

6. The holographic display system of claim 1 further comprising at least one optical component mounted to the motor vehicle and receiving the object beam from the beam splitter.

7. The holographic display system of claim 6 wherein the at least one optical component comprises a windshield directing the object beam to an occupant positioned in the motor vehicle.

8. A computer for a holographic display system of a motor vehicle, the holographic display system providing a maximum intensity value of an intermediate image to decrease in real-time a graphics speckle noise, with the holographic display system including a light source for generating a beam of coherent light, a spatial light modulator (SLM) that has a display with hologram generating unit and a plurality of pixels for modulating the beam of coherent light, a beam splitter for splitting the beam of coherent light into an object beam and an intermediate image beam that is associated with an intermediate image having a graphics speckle noise, and a camera for capturing the intermediate image, the computer comprising:

at least one processor electronically connected to the light source, the SLM, and the camera; and a non-transitory computer readable storage medium (CRM) storing instructions such that the at least one processor is programmed to:

receive the intermediate image from the camera;

compare at least one parameter to at least one threshold value in response to the at least one processor receiving the intermediate image from the camera; and generate an actuation signal associated with a corrective holographic phase shift to decrease the graphics speckle noise for each of the pixels based on the intermediate image, such that the SLM modifies in real-time a holographic phase of the beam of coherent light per pixel in response to the SLM receiving the actuation signal from the at least one processor.

9. The computer of claim 8 wherein the at least one parameter comprises an iteration count, and the at least one threshold value comprises a predetermined threshold number of iterations for each pixel, and the at least one processor increases the iteration count by one.

10. The computer of claim 8 wherein the at least one processor is further programmed to:

calculate a modified entropy in response to the at least one processor receiving the intermediate image from the camera; and generate the actuation signal associated with the corrective holographic phase shift that produces a minimum modified entropy.

11. The computer of claim 10 wherein the at least one processor is further programmed to calculate the modified entropy according to:

$$H[I_{norm}] = \sum_{m=1}^{M}\sum_{n=1}^{N} I_{norm}(m, n)\log[I_{norm}(m, n)]$$

where $H[I_{norm}]$ represents a modified entropy metric;
where $I_{norm}$ represents a normalized camera image; and
where (m, n) represents a number of pixels in an associated one of (x, y) directions.

12. The computer of claim 11 wherein the at least one processor is further programmed to calculate the normalized camera image according to:

$$I_{norm}(m,n) = \beta I(m,n)/I_{max}(m,n)$$

where $I_{max}$ represents the maximum intensity value of the intermediate image.

13. The computer of claim 10 wherein the at least one processor is further programmed to:
calculate a variance metric in response to the at least one processor receiving the intermediate image from the camera; and
generate the actuation signal associated with the corrective holographic phase shift that produces a maximum variance metric.

14. The computer of claim 13 wherein the at least one processor is further programmed to calculate the variance metric according to:

$$V[I] = \frac{1}{MN}\sum_{m=1}^{M}\sum_{n=1}^{N}I^2(m,n) - \left[\frac{1}{MN}\sum_{m=1}^{M}\sum_{n=1}^{N}I(m,n)\right]^2$$

where V[I] represents the variance metric;
where m represents a pixel value in an x-direction with a maximum value M; and
where n represents a pixel value in a y-direction with a maximum value N.

15. The computer of claim 8 wherein the at least one processor is further programmed to:
calculate a loss function value in response to the at least one processor receiving the intermediate image from the camera; and
generate the actuation signal associated with the corrective holographic phase shift that produces a minimum loss function value.

16. The computer of claim 15 wherein the at least one processor is further programmed to calculate the loss function value according to:

$$\min_\theta \mathcal{L}(a_{cal}, a_{target})$$

where $\min_\theta \mathcal{L}$ represents the minimized loss function value;
where $a_{cal}$ represents a modified camera captured image associated with a modified hologram phase; and
where $a_{target}$ represents a target graphics image.

17. A method of operating a holographic display system of a motor vehicle, with the method providing a maximum intensity value of an intermediate image to decrease a graphics speckle noise, the holographic display system includes a light source, a spatial light modulator (SLM), a beam splitter, a camera, and a computer having at least one processor and a non-transitory computer readable storage medium (CRM), with the SLM having a display with a hologram generating unit and a plurality of pixels, the method comprising:
generating, using the light source, a beam of coherent light;
modulating, using the display of the SLM, the beam of coherent light in response to the display receiving the beam of coherent light from the light source;
splitting, using the beam splitter, the beam of coherent light into an object beam and an intermediate image beam that is associated with an intermediate image having the graphics speckle noise;
capturing, using the camera, the intermediate image in response to the camera receiving the intermediate image beam from the beam splitter;
receiving, using the at least one processor, the intermediate image from the camera;
comparing, using the at least one processor, at least one parameter to at least one threshold value;
generating, using the at least one processor, an actuation signal associated with a corrective holographic phase shift to decrease the graphics speckle noise for each of the pixels based on the intermediate image; and
modifying in real-time, using the SLM, a holographic phase of the beam of coherent light per pixel in response to the SLM receiving the actuation signal from the at least one processor.

18. The method of claim 17 further comprising:
comparing, using the at least one processor, an iteration count to a predetermined threshold number of iterations for each pixel; and
increasing, using the at least one processor, the iteration count by one.

19. The method of claim 17 further comprising:
calculating, using the at least one processor, a modified entropy and a variance metric in response to the at least one processor receiving the intermediate image from the camera; and
generating, using the at least one processor, the actuation signal associated with the corrective holographic phase shift that produces a minimum modified entropy and a maximum variance metric.

20. The method of claim 17 further comprising:
calculating, using the at least one processor, a loss function value in response to the at least one processor receiving the intermediate image from the camera; and
generating, using the at least one processor, the actuation signal associated with the corrective holographic phase shift that produces a minimum loss function value.

* * * * *